(12) United States Patent
Murakami

(10) Patent No.: US 8,965,627 B2
(45) Date of Patent: Feb. 24, 2015

(54) DISTANCE BASED VEHICLE UPDATING SERVER

(75) Inventor: Masahiko Murakami, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 417 days.

(21) Appl. No.: 13/486,551

(22) Filed: Jun. 1, 2012

(65) Prior Publication Data

US 2012/0323402 A1    Dec. 20, 2012

(30) Foreign Application Priority Data

Jun. 16, 2011    (JP) .................. 2011-134375

(51) Int. Cl.
*G07C 5/00*    (2006.01)
*G06F 9/445*   (2006.01)

(52) U.S. Cl.
CPC .  *G07C 5/008* (2013.01); *G06F 8/65* (2013.01)
USPC .......... 701/32.4; 701/36; 701/29.1; 701/32.3; 701/33.2; 701/300

(58) Field of Classification Search
CPC ........... G06F 9/444; G06F 8/65; G08G 1/123; G08G 1/127; G08G 1/13; G08G 1/133; G08G 1/137; G08G 5/008
USPC ........... 701/1, 36, 115, 29.1, 31.4, 31.5, 32.3, 701/32.4, 33.2, 482, 484, 485, 491, 516, 701/517, 526, 541, 300; 340/988–993; 717/168–173
See application file for complete search history.

(56) References Cited

U.S. PATENT DOCUMENTS

2006/0122744 A1* 6/2006 Hayashi et al. .................. 701/1
2013/0132939 A1* 5/2013 Murata et al. ................. 717/173

FOREIGN PATENT DOCUMENTS

JP    A-2007-065856    3/2007
JP    A-2010-243339    10/2010

* cited by examiner

*Primary Examiner* — Spencer Patton
(74) *Attorney, Agent, or Firm* — Oliff PLC

(57) ABSTRACT

A server that delivers a control program for an on-vehicle apparatus detects a distance between a vehicle and a user of the vehicle, and instructs the on-vehicle apparatus to update the control program by use of an update program when the detected distance is equal to or longer than a prescribed distance.

20 Claims, 11 Drawing Sheets

DISTANCE BASED VEHICLE UPDATING SERVER

BACKGROUND OF THE INVENTION

1. Field of the Invention

The invention relates to a technology that delivers a control program that controls an on-vehicle apparatus for installation in a vehicle.

2. Description of the Background Art

On a controller for installation in a vehicle, such as an engine controller or a navigation apparatus, various functions relevant to vehicle control are implemented by executing control programs. Such a control program for the controller requires reprogramming (updating of a program) for adding a new function or repairing a found fault. Proposed is the technology that updates such a control program of the controller through a network. For example, Japanese Patent Application Laid-open Publication No. 2010-243339 discloses a technology that updates a control program of a navigation apparatus through a network. The technology updates the control program while a vehicle is parked at home or the other place in order to prevent inadvertent update of the control program on the running vehicle.

However, it is assumed that, by the technology disclosed on the publication, the control program to be updated will grow in program size due to the complex functions, and that accordingly updating the program will take a longer time. Updating the program for a longer time increases the possibility that a user of the vehicle operates the devices installed in a vehicle.

Operation on the on-vehicle device by the user of the vehicle during updating of the control program causes fluctuation in voltage supplied by a battery of the vehicle. As a result, an operation of the apparatus whose control program is being updated fluctuates, which can lead to unsuccessful completion of updating the control program.

SUMMARY OF THE INVENTION

According to one aspect of the invention, a server includes a transmitter that sends an update program to an on-vehicle apparatus that updates a control program of a controller installed in a vehicle, a server controller that detects a distance between the vehicle and a user of the vehicle, and instructs the on-vehicle apparatus to update the control program by use of the update program when the detected distance is equal to or longer than a first distance.

This prevents the user from getting in the vehicle and operating the on-vehicle device during updating of the control program, since the server gives an instruction to update the control program when the user is far enough away from the vehicle. Therefore, updating the control program is completed effectively.

According to another aspect of the invention, the server controller of the sever notifies the user to send a permission to update the control program when the detected distance is equal to or longer than the first distance, and receives a permission signal that indicates the permission to update the control program from the notified user. The server controller instructs the on-vehicle apparatus to update the control program by use of the update program when the permission signal has been received.

This allows the permission to be obtained from the user for updating the control program before the server gives an instruction to update the control program. Therefore, this effectively prevents the start of updating the control program when the user plans to get in the vehicle.

Therefore, the object of the invention is to prevent a user from operating an on-vehicle apparatus during updating of a control program of a controller installed in a vehicle.

These and other objects, features, aspects and advantages of the invention will become more apparent from the following detailed description of the invention when taken in conjunction with the accompanying drawings.

DESCRIPTION OF THE EMBODIMENTS

Hereinafter, some embodiments of the invention are described with reference to attached drawings.

Figure 1:
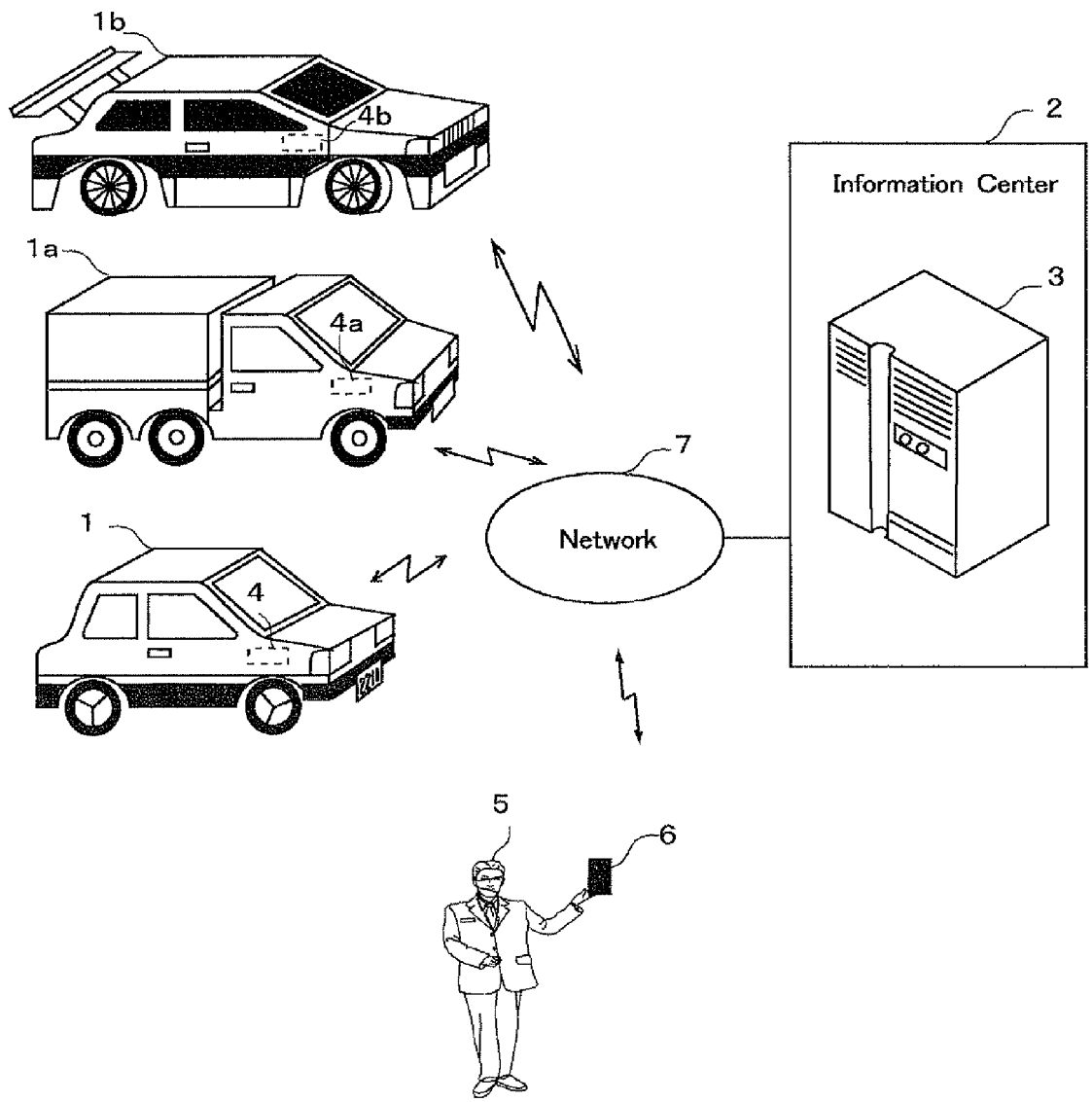
FIG. 1 outlines a program delivery system.

FIG. 1 outlines a program delivery system 100 of the embodiment.

The program delivery system 100 includes a server 3 set at an information center 2 that is a center to deliver information to a vehicle 1 such as a car, an on-vehicle apparatus 4 installed on the vehicle 1, and a mobile device 6 carried by a user 5 of the vehicle 1.

The server 3, the on-vehicle apparatus 4 and the mobile device 6 are capable of communicating with each other through a network 7 such as the Internet. The user 5 carrying the mobile device 6 who is on board the vehicle 1 (typically a driver) or an operator of the vehicle 1 can operate an on-vehicle device such as a door lock system, an engine starter, or an audio system of the vehicle 1.

The server 3 is a computer system including hardware and software that sends to the on-vehicle apparatus 4 an update program for updating a control program of an engine ECU (Electronic Control Unit) detailed later or the like that is installed on the vehicle 1. The server 3 is capable of sending the update program concurrently to a plurality of the on-vehicle apparatuses 4, 4a and 4b and of a plurality of the vehicles 1, 1a and 1b. The controllers for drive control of a vehicle and for drive assistance, such as the engine ECU, a transmission ECU and a navigation ECU, are collectively called vehicle controllers.

The control program of the vehicle controller activates a control function installed on the vehicle 1 targeted for, such as an engine, a transmission or a navigation apparatus, based on prescribed processing. The update program updates the control program that has been stored in the vehicle controller in such a case where a new function is added or a defect is found.

The on-vehicle apparatus 4 is an ECU that receives from the server 3 the update program for updating the control program of the vehicle controller.

The mobile device 6 is a portable device carried by the user 5.

Figure 2:
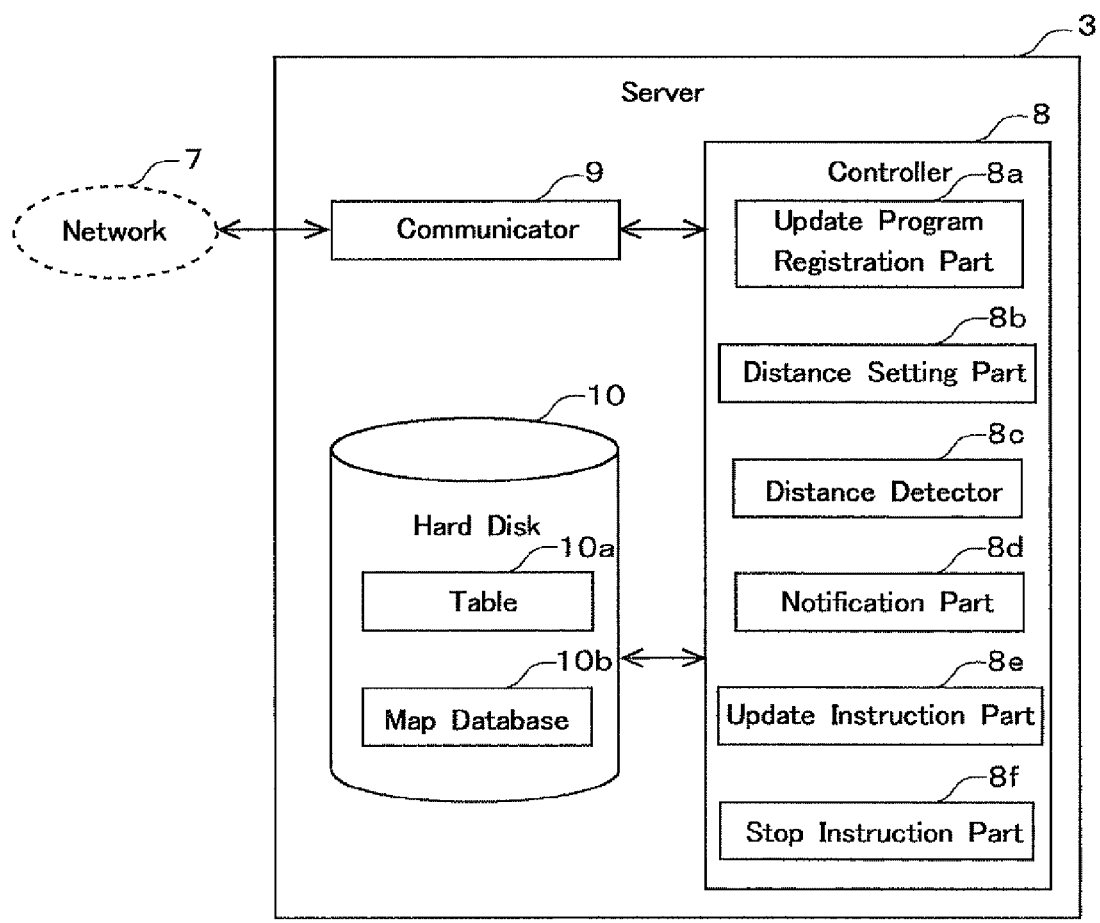
FIG. 2 shows a configuration of a server.

FIG. 2 shows a configuration of the server 3. The server 3 is the computer system that includes a controller 8, a communicator 9 and a hard disk 10. The server 3 is capable of transmitting and receiving various kinds of information through the Internet between the on-vehicle apparatus 4 installed on the vehicle 1 and between the mobile device 6 carried by the user 5 of the vehicle 1, by the communicator 9.

The controller 8 is a computer including a CPU, RAM and ROM that are not shown in FIG. 2. The ROM of the controller 8 stores a server program. The CPU executes the server program to activate various functions. An update program registration part 8a, a distance setting part 8b, a distance detector 8c, a notification part 8d, an update instruction part 8e and a stop instruction part 8f shown in FIG. 2 are part of the functions that are activated when the CPU executes the server program. The controller 8 that is connected with the communicator 9 and the hard disk 10 is capable of transmitting and receiving various kinds of information.

The update program registration part 8a registers the update program. The update program is created at the information center 2. The update program sent to the server 3 by the input device not shown in FIG. 2 is registered in the update program registration part 8a. The registered update program is sent to the communicator 9 by the controller 8, and then, sent from the communicator 9 to the on-vehicle apparatus 4 of the vehicle 1 through the network 7.

The distance setting part 8b sets, as a condition for starting updating the control program, a distance (hereafter, referred to as "distance-for-update") between the vehicle 1 and the mobile device 6 carried by the user 5 of the vehicle 1. The description below is based on the assumption that the mobile device 6 is carried by the user 5 at all times. The distance between the vehicle 1 and the user 5 also indicates the distance between the vehicle 1 and the mobile device 6 carried by the user 5.

When the distance set by the distance setting part 8b is shorter than the distance between the vehicle 1 and the user 5, the control program is updated as described later. That is because, when the user 5 is farther away from the vehicle 1: the distance exceeding a certain distance, the user 5 cannot get in the vehicle 1 to operate the on-vehicle device before completion of updating the control program, even if updating the control program takes longer period. Therefore, the distance setting part 8b sets, based on update duration required for updating the control program, the distance that is long enough to prevent the user 5 from operating the on-vehicle devices before the completion of updating the control program. The distance setting part 8b sets as the distance-for-update, for example, 1000 meters. At this time, the distance setting part 8b sets the distance-for-update with reference to a table 10a stored in the hard disk 10.

The table 10a has various kinds of data including the size of the update program, the type of the computer that updates the control program, the update duration required for updating the control program, the distance required for updating the control program, and the average moving velocity of the user 5. These data are associated with each other. In an example, when the size of the update program corresponds to 1 GB, in accordance with the type of the computer that updates the control program, the following data are used for reference from the table 10a: 15 minutes as the update duration required for updating the control program, and 1000 meters as the distance required for updating the control program.

The distance detector 8c derives the current distance between the vehicle 1 and the user 5 (hereinafter, referred to as "vehicle-user distance"). For derivation of the distance, the distance detector 8c receives the signals that indicate position data including latitude and longitude respectively from the on-vehicle apparatus 4 of the vehicle 1 and the mobile device 6 carried by the user 5, and processes the position data by a prescribed arithmetic processing. The distance detector 8c also calculates the vehicle-user distance periodically or every time the position data are transmitted from the on-vehicle apparatus 4 and the user 5.

The notification part 8d transmits various notices to the mobile device 6 carried by the user 5. The notices are transmitted by e-mail. After the update program is sent from the server 3 to the on-vehicle apparatus 4, the notification part 8d transmits a notice to ask the user 5 whether or not the user 5 permits updating the control program. That is, the notification part 8d transmits a notice to the mobile device 6 carried by the user 5 to ask the user 5 to permit updating the program. The notification part 8d transmits the notice when it is judged that the vehicle-user distance derived by the distance detector 8c is longer than the distance-for-update set by the distance setting part 8b, that is, when the user 5 is farther from the vehicle 1 than the distance-for-update. The notification part 8d also transmits to the user the notice that notifies the user 5 of the control program being updated when it is judged that the user 5 is moving closer to the vehicle 1 and is likely to get in the vehicle 1 during the period after the start of updating the control program but before the completion of updating the control program. The case where it is judged that the user 5 is likely to get in the vehicle 1 is, that is, the case where it is at least judged that the user 5 is closer to the vehicle 1 than the distance-for-update.

Condition for judging that the user 5 is likely to get in the vehicle 1 may be whether the user 5 is closer to the vehicle 1 than a certain distance which is shorter than the distance-for-update (hereinafter, referred to as "updating-notification-distance"). For example, the distance of 10 meters is set as the updating-notification-distance. In this case, it is judged that the user 5 is more likely to get in the vehicle 1. Upon receipt of the notice, the user 5 abandons getting in the vehicle 1, and the operation on the on-vehicle devices during updating the control program is avoided.

The notification part 8d transmits a notice to the user 5 in accordance with the current status of update, which indicates completion, non-execution or stop of updating the control program.

The update instruction part 8e transmits to the on-vehicle apparatus 4 an instruction signal to update the control program in the vehicle controller by use of the update program. The instruction signal is transmitted through the communicator 9 and the network 7 to the on-vehicle apparatus 4. The update instruction part 8e transmits the instruction signal when the reply from the user 5 indicating permission of update is received in response to the notice transmitted from the notification part 8d for asking the user 5 about permission of the update. The update instruction part 8e may transmit the instruction signal not when the reply from the user 5 indicating permission of update is received, but when it is judged that the vehicle-user distance is longer than the distance-for-update.

The stop instruction part 8f transmits to the on-vehicle apparatus 4 the instruction signal to stop updating the control program during the period after the start of updating the control program but before the completion of updating the control program. The instruction signal is transmitted when the user 5 moves closer to the vehicle 1 than a prescribed distance between the user 5 and the vehicle 1 (hereinafter, referred to as "update-stop-distance") after the start of updating the control program. That is, the case is when the user 5 moves in the close range of the vehicle 1 and is surely foreseen to get in the vehicle 1 or operate the on-vehicle devices. A certain distance, for example, 0.8 meters, is set as the update-stop-distance.

The communicator 9 is capable of connecting the server 3 and the network 7, and controlling data communication between them. When transmitting data from the server 3 to the network 7, the communicator 9 converts the form of the data suitable for data communication in the network 7. When receiving data from the network 7 to the server 3, the communicator 9 converts the form of the data suitable for processing in the server 3, and transmits the received data to the controller 8.

The hard disk 10 that is a nonvolatile rewritable memory stores the table 10a and a map database 10b. The table 10a has various kinds of data including the size of the update program, the type of the computer that updates the control program, the update duration required for updating the control program, and the distance required for updating the control program. The table 10a is used for reference when the distance setting part 8b sets the distance-for-update. The map database 10b stores map data. The map data include the data of the roads on which the vehicle 1 can drive, which are associated with the location data including latitude and longitude. Moreover, the hard disk 10 stores the location data of the vehicle 1 transmitted from the on-vehicle apparatus 4.

Figure 3:
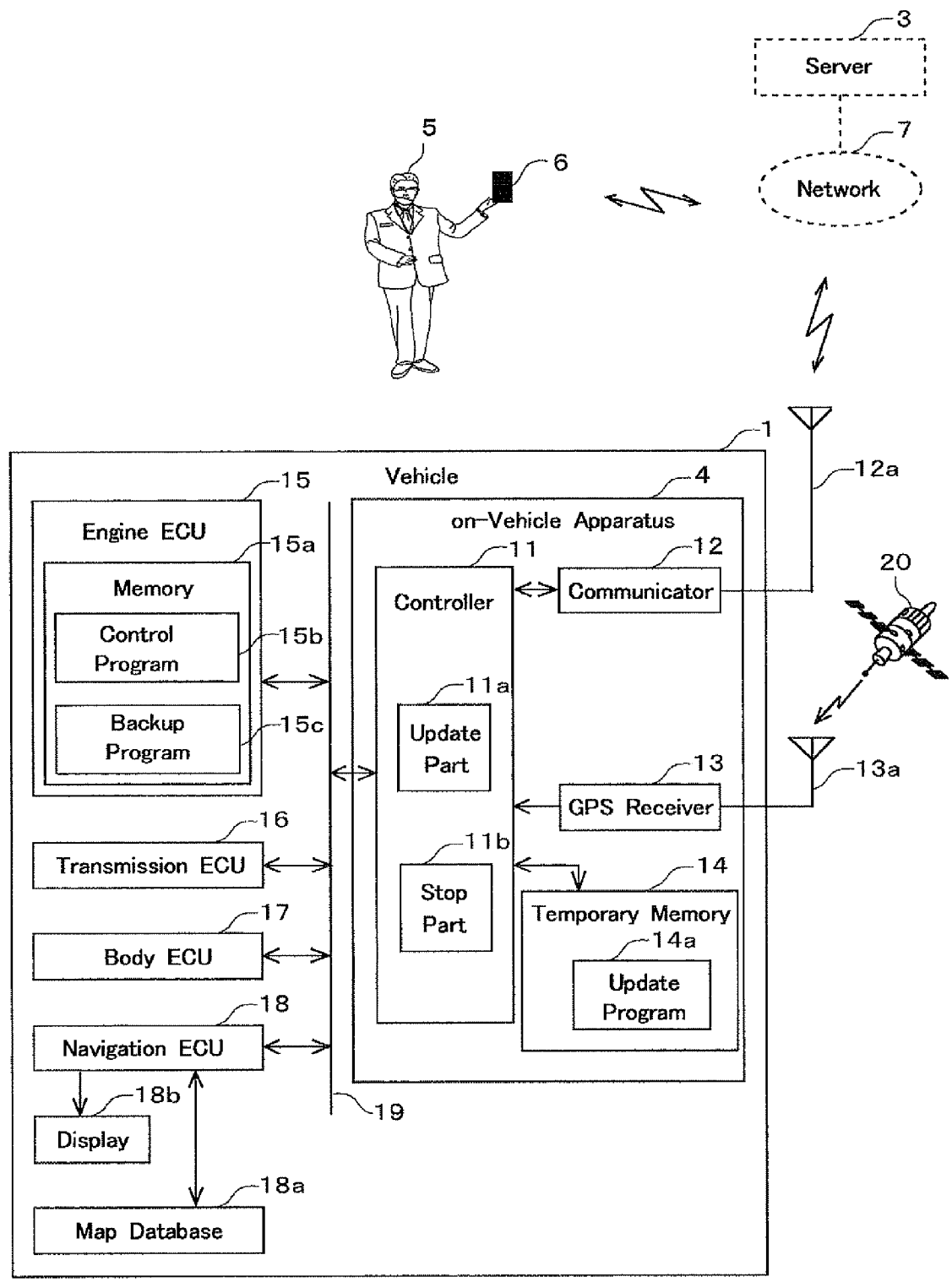
FIG. 3 shows a configuration of an on-vehicle apparatus.

FIG. 3 shows mainly a configuration of the on-vehicle apparatus 4. The on-vehicle apparatus 4 that is installed inside the vehicle 1 is an ECU that includes a controller II, a communicator 12, a GPS receiver 13 and a temporary memory 14. Further, the on-vehicle apparatus 4 is connected with various vehicle controllers such as an engine ECU 15, a transmission ECU 16, a body ECU 17 and a navigation ECU 18. The on-vehicle apparatus 4 and the vehicle controllers 15, 16, 17 and 18 are interconnected by a CAN (Controller Area Network) 19. Among the on-vehicle apparatus 4 and the vehicle controllers that are interconnected by the CAN 19, the various kinds of data including velocity, engine speed, status of a break, and data of fault diagnosis are transmitted and received. The various kinds of transmitted and received data include the update time and program identification data such as revision data of the control program, in addition to an update program 14a.

The controller 11 includes an update part 11a and a stop part 11b. Further, the controller 11 is a microprocessor including a CPU, RAM and ROM not shown in FIG. 3. The controller 11 controls the on-vehicle 4 by CPU processing in accordance with a program as firmware stored in ROM in advance. The update part 11a and the stop part 11b are part of the functions executed by CPU processing.

The controller 11 includes a so-called sleep mode that is activated after the user 5 cuts off the power not shown in FIG. 3.

The update part 11a reads out the update program 14a stored in the temporary memory 14 described later, and updates the control program of the vehicle controller such as the engine ECU 15 that is connected to the on-vehicle apparatus 4.

The stop part 11b stops updating the control program executed by the update part 11a.

The communicator 12 includes a communication function executed by use of a wireless communication technology such as WiMAX (Worldwide Interoperability for Microwave Access). The communicator 12 communicates with other wireless communicators through the network 7 by transmitting and receiving signals from and at a communication antenna 12a. Therefore, the on-vehicle apparatus 4 is capable of transmitting and receiving various kinds of data between the server 3 and between the mobile device 6 by the function of the communicator 12.

The GPS receiver 13 receives at a GPS antenna 13a the signals transmitted from a plurality of GPS satellites 20 that travel in an orbit above the vehicle 1. Each of the signals transmitted from the GPS satellites 20 includes time data and satellite orbit data. The GPS receiver 13 transmits the received signal to the controller 11. The controller 11 calculates the distance between the satellite and the vehicle 1 by prescribed arithmetic processing such as by multiplying by a radio wave velocity the time lag from transmitting a signal from one of the GPS satellite 20 to receiving the signal at the GPS receiver 13. Then, the controller 11 calculates the spatial location of the vehicle 1 as the data of latitude and longitude based on the distance data from the plurality of the GPS satellites.

The temporary memory 14 that is a nonvolatile semiconductor memory is capable of reading and writing data electrically and of keeping data even in a power-off state. The temporary memory 14 includes EEPROM (Electrically Erasable Programmable Read-Only Memory) or flash memory. The temporary memory 14 temporarily stores the update program 14a. When new update program is sent from the controller 11, the temporary memory 14 overwrites the stored program to store the new update program. As above, the temporary memory 14 functions as a so-called buffer.

The update program 14a adds a function to or repairs a fault on the control program stored in the vehicle controller. The update program 14a is created at the information center 2, and sent to the on-vehicle apparatus 4 through the network 7 by the server 3. The update program 14a includes program revision data and identification data in terms of the vehicle or the vehicle controller to be updated. The update program 14a may be the program having only the part to be updated, or the program covering the whole program for updating.

The engine ECU 15 receives data on driving conditions from a sensor installed in the vehicle 1, and electronically controls a fuel injection quantity, ignition timing and engine speed on an engine. These electronic controls are performed by executing a control program 15b stored in a memory 15a. The memory 15a stores the control program 15b for electrically controlling the engine and a backup program 15c for use as a so-called backup at the time of updating the control program 15b. The memory 15a, the control program 15b and the backup program 15c stored in the memory 15a are also included in other vehicle controllers such as the transmission ECU16, the body ECU 17 and the navigation ECU 18, which are not shown in FIG. 3.

The transmission ECU 16 receives data on the engine speed, vehicle speed, accelerator opening, etc. from the sensor installed on the vehicle 1, and controls transmission of the vehicle 1 so that the rotational velocity and torque of the power transmitted from the engine become appropriate.

The body ECU 17 controls a door lock system, lighting, a windshield wiper and an air conditioner.

The navigation ECU 18 reads out map data from a map database 18a, and displays on a display 18b a map in accordance with the current location of the vehicle 1 specified by the signal received by the UPS receiver 13. The map database 18a that is a nonvolatile memory stores the map data. The map data include the data of the roads on which the vehicle 1 can drive. The navigation ECU 18 searches the route to the destination set by the user 5, and displays the route data as well as the map on the display 18*b*.

Figure 4:
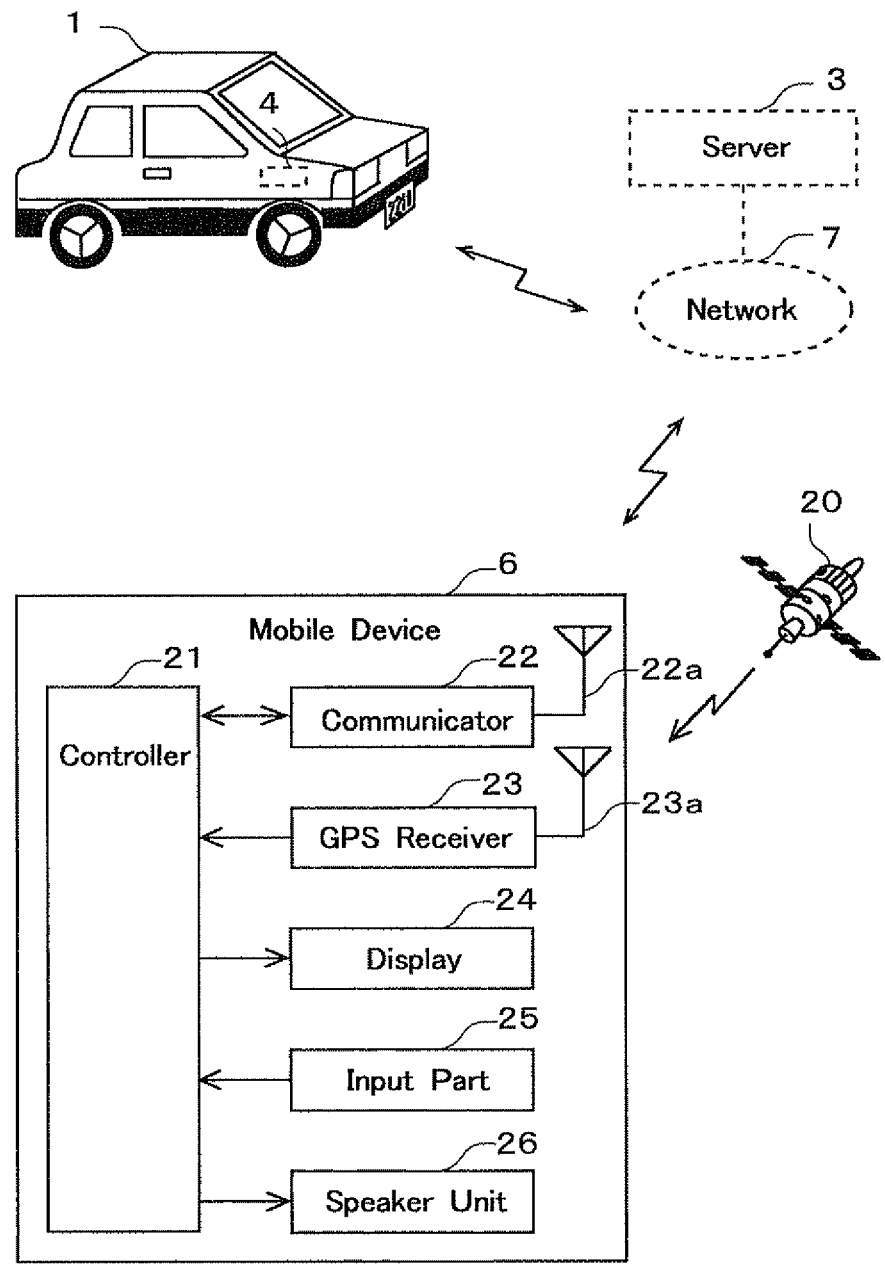
FIG. 4 shows a configuration of a mobile device.

FIG. 4 shows the configuration of the mobile device 6 carried by the user 5. Any device that is capable of transmitting the location data of the mobile device 6 to the server 3 and being carried by the user 5 can be used as the mobile device 6, for example, a mobile phone. The mobile device 6 includes a controller 21, a communicator 22, a GPS receiver 23, a display 24, an input part 25 and a speaker unit 26.

The controller 21 is a microprocessor that is connected to the communicator 22, the GPS receiver 23, the display 24, the input part 25 and the speaker unit 26. The controller 21 controls the communicator 22 so as to transmit and receive signals when communicating with the external server 3. The controller 21 also calculates the distance between one of the GPS satellites 20 and the mobile device 6 by arithmetic-processing in a prescribed manner the signal received by the GPS receiver 23 from the satellite. Then, the controller 21 calculates the spatial location of the mobile device 6 as the data of latitude and longitude based on the distance data from the plurality of GPS satellites. When informing the user 5 of data, the controller 21 controls the display 24 to display the data, and receives the signal input by the user 5 on the input part 25.

The communicator 22 includes a communication function using a wireless communication technology such as WiMAX. The communicator 22 communicates with other wireless communicators through the network 7 by transmitting and receiving signals from and at a communication antenna 22*a*. The mobile device 6 is capable of transmitting and receiving various kinds of data with the server 3 and the on-vehicle apparatus 4.

The GPS receiver 23 receives at a GPS antenna 23*a* the signals transmitted from the plurality of GPS satellites 20 that travel in an orbit above the vehicle 1. Each of the signals transmitted from the GPS satellites 20 includes the time data and the satellite orbit data. The GPS receiver 23 transmits the received signal to the controller 21.

The display 24 has a screen for displaying the data having figures and characters to inform the user 5 carrying the mobile device 6 of the data.

The speaker unit 26 produces various kinds of sounds to inform the user 5 of data.

The input part 25 includes a plurality of buttons which are set around the display 24, and operations of the user 5 are input. Upon inputting of the operation of the user 5, the input part 25 transmits the received operation data to the controller 21. The input part 25 may be included as a touch sensor on the surface of the display 24.

Next, processing of the server 3 on the program delivery system 100 is described.

Figure 5:
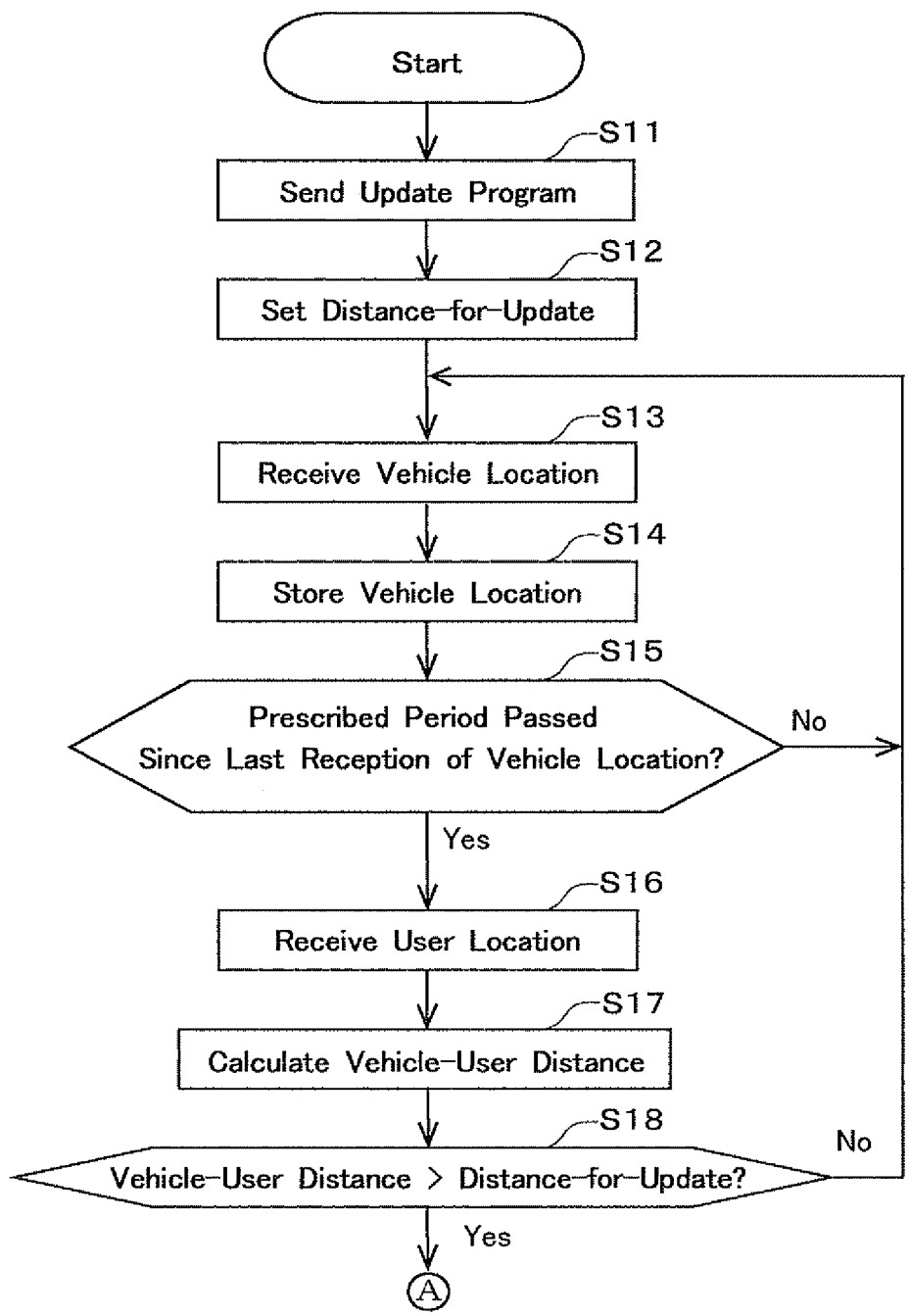
FIG. 5 shows a flow of program delivery processing on a server.
Figure 6:
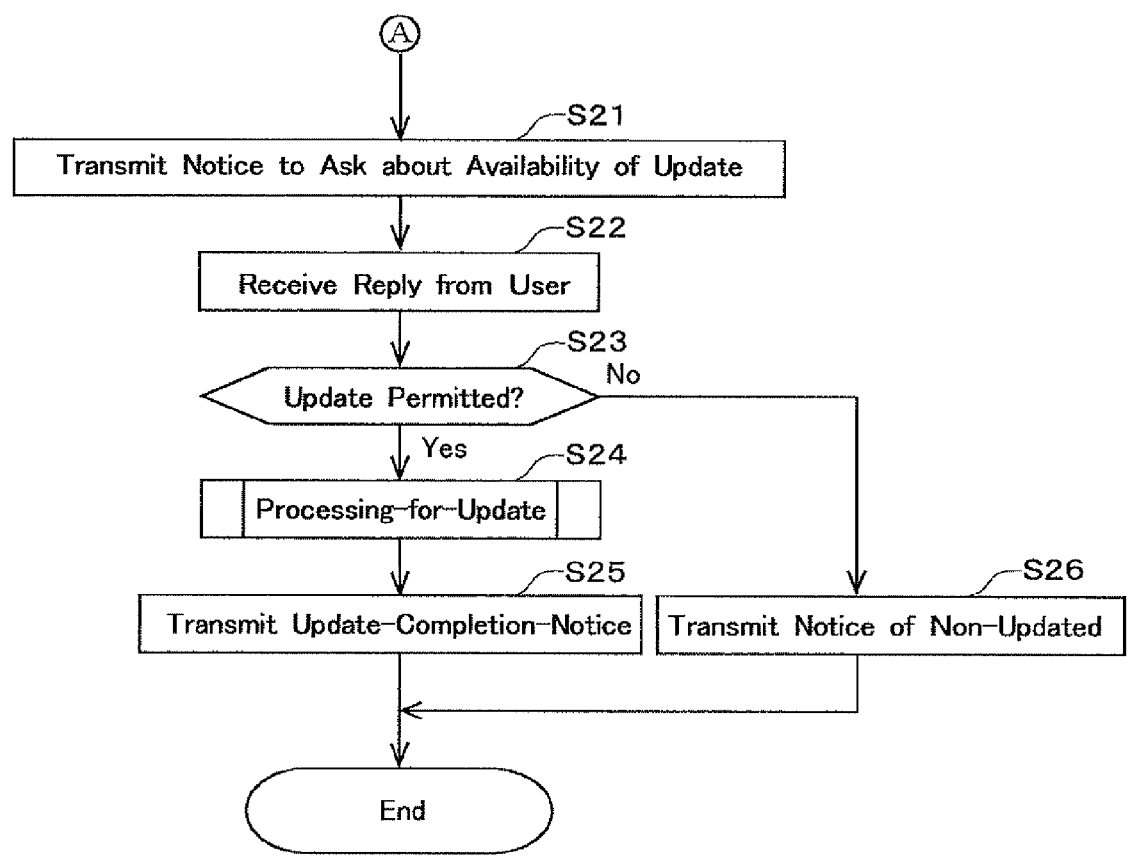
FIG. 6 shows another flow of the program delivery processing on the server.

Each of FIG. 5 and FIG. 6 shows a processing flow on the server 3. The processing starts when the update program created at the information center 2 is registered in the update program registration part 8*a* of the server 3.

First, the controller 8 of the server 3 sends the update program registered in the update program registration part 8*a* from the communicator 9 through the network 7 to the on-vehicle apparatus 4 (step S11). When the programs stored in the vehicles 1, 1*a* and 1*b* (refer to FIG. 1) are to be updated, the controller 8 sends the update program simultaneously to the on-vehicle apparatuses 4, 4*a* and 4*b*. In this case, the controller 8 sends the update program regardless of the time slot for transmission, location of the vehicle 1 including the on-vehicle apparatus 4 or the state of the vehicle 1, ie. running or not. That is because receiving the update program makes no effect on running of the vehicle 1 since the on-vehicle apparatus 4 includes the temporary memory 14.

Next, the distance setting part 8*b* sets a distance that permits updating the control program (hereinafter, referred to as "distance-for-update") (step S12). The term of distance is the distance between the vehicle 1 and the user 5 (actual distance is referred to as "vehicle-user distance"). When the vehicle-user distance is longer than the set distance-for-update, updating the control program is permitted. The distance-for-update is set in accordance with the update duration required for updating the control program. When longer update duration is required for updating the control program, the distance setting part 8*b* sets a longer distance as the distance-for-update. The relations between the update duration required for updating the control program and the distance-for-update are included in the table 10*a* of the hard disk 10 in advance. Therefore, the distance setting part 8*b* sets the distance-for-update in reference to the table 10*a*. Setting the distance-for-update prevents the user 5 from getting in the vehicle 1 and operating the on-vehicle devices during updating the control program. That is, updating the control program can be completed without the power fluctuation and the noise generation normally caused by operation on the on-vehicle devices during updating the control program.

Next, the distance detector 8*c* of the server 3 receives the signal indicating the location data of the vehicle 1 through the communicator 9 (step S13). The location data that include the data on latitude and longitude are transmitted at predetermined intervals from the on-vehicle apparatus 4 installed in the vehicle 1. The distance detector 8*c* may receive the location data only of the vehicle to which the update program has been sent, or the location data of all the vehicles connected to the server 3 through the network 7. The distance detector 8*c* stores the received location data of the vehicle 1 by overwriting the location data stored in the hard disk 10 (step S14). Therefore, the location data of the vehicle 1 stored in the hard disk 10 is always updated to the latest data.

Next, the distance detector 8*c* judges whether the prescribed period or longer has passed since the last time the location data of the vehicle 1 are received (step S15). When the ignition switch (a switch for turning on or off a battery circuit to start the engine or activate the on-vehicle apparatuses) of the vehicle 1 is on, the location data are transmitted from the vehicle 1. Thus, when the distance detector 8*c* judges that the prescribed period or longer has passed since the last time the location data of the vehicle 1 are received (Yes at the step S15), it is deemed that the vehicle 1 stops and the user 5 has gotten out of the vehicle 1.

Since the location data from the vehicle 1 are transmitted at predetermined intervals, the predetermined interval for transmitting the location data of the vehicle 1 can be also used as the prescribed period. For example, the time of 10 minutes, which is the predetermined interval for transmitting the location data from the vehicle 1 is set as the prescribed period.

When judging that the prescribed period or longer has not passed since the last time the location data of the vehicle 1 are received (No at the step S15), the distance detector 8*c* again receives the location data of the vehicle 1 (step S13) and stores the location data of the vehicle 1 (step S14).

When judging that the prescribed period or longer has passed since the last time the location data of the vehicle 1 are received, next, the distance detector 8*c* receives the location data of the user 5 (step S16). Receiving the location data of the user 5 is receiving the signal indicating the location data transmitted from the mobile device 6 carried by the user 5.

The location data that include the data of latitude and longitude are transmitted at predetermined intervals from the mobile device 6.

Next, the distance detector 8c calculates the vehicle-user distance (step S17). The distance detector 8c calculates the vehicle-user distance based on the location data of the vehicle stored in the hard disk 10 and the location data of the user received at the step S16. The vehicle-user distance is the straight-line distance or the shortest road distance between the vehicle and the user. As for the straight-line distance between the vehicle and the user, the distance detector 8c calculates by prescribed arithmetic processing based on the latitudes and longitudes of the two. As for the shortest road distance between the vehicle and the user, the distance detector 8c calculates in reference to the map database 10b in the hard disk 10 based on the latitudes and longitudes of the two.

Next, the distance detector 8c compares the vehicle-user distance and the distance-for-update (step S18). The case where it is judged that the vehicle-user distance is longer than the distance-for-update (Yes at the step S18) is, that is, the case where it is judged that the user 5 is too far from the vehicle 1 to get in the vehicle 1 and does not operate the on-vehicle devices during updating the control program. In this case, the procedure moves to step S21.

On the other hand, the case where it is judged that the vehicle-user distance is not longer than the distance-for-update (No at the step S18) is, that is, the case where it is judged that the user 5 exists near the vehicle 1 and is likely to get in the vehicle 1 and operate the on-vehicle devices during updating the control program. In this case, the procedure does not move to the step S21, but moves back to the step S13, and again receives and stores the location data of the vehicle. That is, in the case of No at the step S18, the user may have got out of the vehicle only for taking a short break. In this case, after the short period of stopping or getting out of the vehicle, the user may get in the vehicle to drive again. Thus, the distance detector 8c needs to receive and store the location data of the vehicle, and again to calculate the vehicle-user distance.

In the case of Yes at the step S18, next, the notification part 8d transmits the notice to ask the user 5 carrying the mobile device 6 whether the user 5 permits updating the control program (step S21 in FIG. 6). The reason for asking the user 5 whether the user 5 permits updating the control program is because that the user 5 may not want to update the control program and want again to get in the vehicle 1 under the current vehicle conditions, or may want to use the vehicle 1 immediately. The notice may be transmitted by e-mail to the mobile device 6 of the user 5.

Next, the notification part 8d receives a reply from the mobile device 6 of the user 5 (step S22). The reply from the user 5 indicates one of the permission signal that indicates permission of updating the control program and the non-permission signal that indicates non-permission of updating the control program. The update instruction part 8e waits for the reply to be received from the user 5 without updating the control program. The update instruction part 8e may update the control program when any reply from the user 5 has not been received in a prescribed period after the notice is transmitted for asking the user 5 whether the user 5 permits updating the control program. This is because updating the control program is not to degrade the performance of the vehicle 1, but to add a new function or to repair a found fault. However, when the reply from the user 5 indicates the non-permission signal after the control program is updated, an update program for returning the updated control program back to its original conditions before updating is again transmitted from the server 3 to the on-vehicle apparatus 4.

Next, the update instruction part 8e judges whether the reply from the user 5 received by the notification part 8d indicates "permission" of updating the control program (step S23). When the reply indicating the non-permission signal is transmitted from the user 5 (No at the step S23), the update instruction part 8e does not give an instruction to update the control program, and the procedure moves to step S24 (hereinafter, referred to as "processing-for-update").

When the reply indicating the non-permission signal is transmitted from the user 5, the notification part 8d transmits to the mobile device 6 of the user 5 the notice indicating that the control program is not updated (step S26). The received notice notifies the user 5 of the control program not updated. Later, when the user 5 wants to update the control program, the user 5 can receive the update program again by applying to the information center.

On the other hand, when the reply indicating the permission signal that indicates permission of updating the control program is transmitted from the user 5 at the step S23 (Yes at the step S23), the procedure moves to step S24. At the step S24, the update instruction part 8e mainly gives to the on-vehicle apparatus 4 an instruction to update the control program for the processing-for-update (step S24). The details of the processing-for-update are described later.

When it is judged that the processing-for-update has been completed, the notification part 8d transmits the notice that indicates completion of updating the control program to the mobile device 6 of the user 5 (step S25). Upon receipt of the notice indicating normal completion of updating the control program, the user 5 can get in the vehicle 1 with ease.

Figure 7:
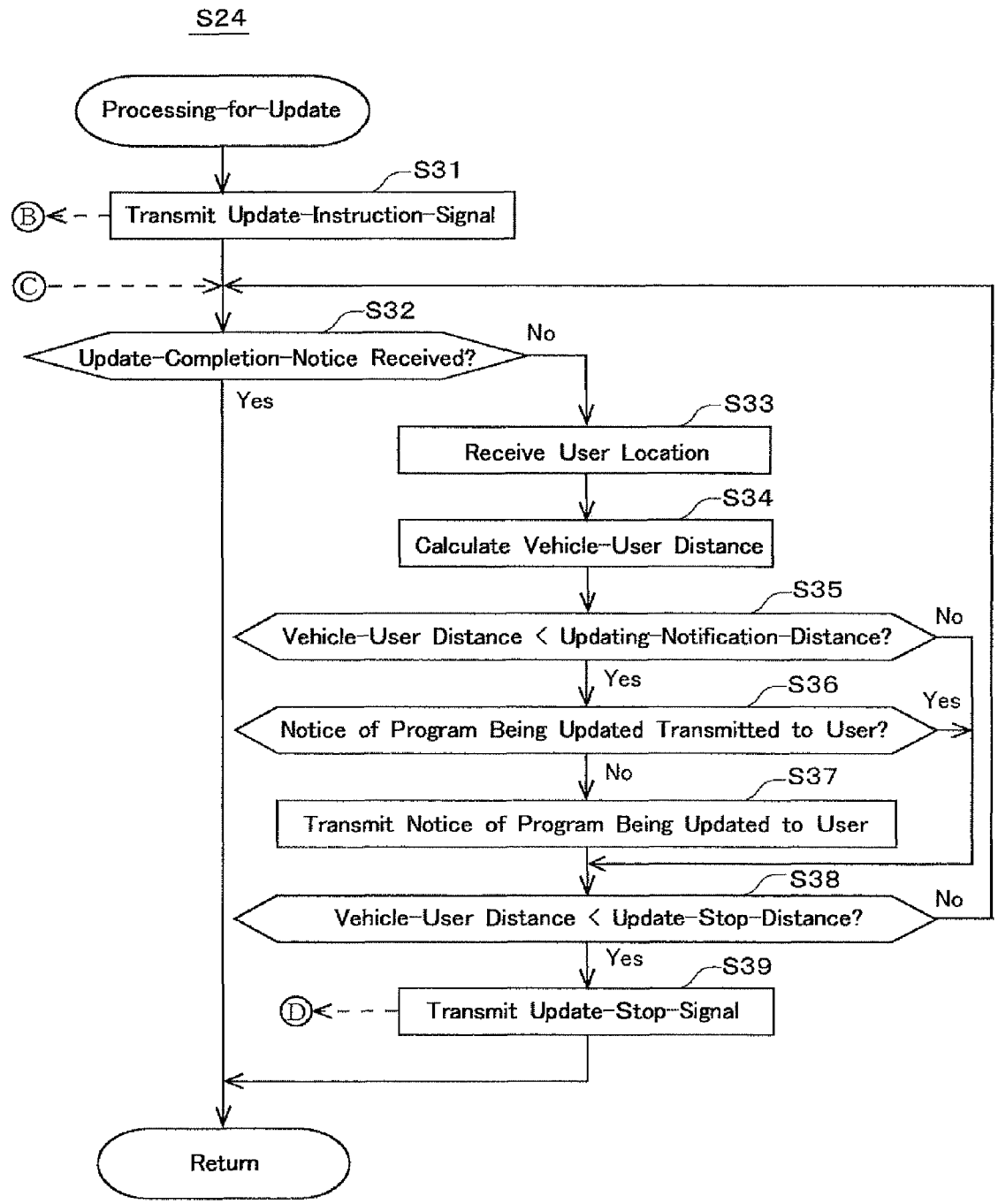
FIG. 7 shows another flow of the program delivery processing on the server.

Next, the processing-for-update on the server 3 is described. FIG. 7 shows the flow of the processing-for-update on the server 3, which indicates the details of the step S24 in FIG. 6.

First, the update instruction part 8e transmits to the on-vehicle apparatus 4 an update-instruction-signal that indicates the instruction to update the control program (step S31).

Next, the update instruction part 8e judges whether the update instruction part 8e has received from the on-vehicle apparatus 4 the notice that is transmitted after completion of updating the control program on the on-vehicle apparatus 4 (hereinafter, referred to as "update-completion-notice") (step S32). When receiving the update-completion-notice (Yes at the step S32), the processing-for-update terminates. On the other hand, when not receiving the update-completion-notice (No at the step S32), the distance detector 8c receives the signal that indicates the location data and is transmitted from the mobile device 6 carried by the user 5 (step S33).

Steps after the step S33 are implemented by the server 3 when the user 5 moves close to the vehicle 1 before completion of updating the control program. In the case where the user 5 needs to get in the vehicle 1 immediately, the user 5 rapidly moves closer to the vehicle 1. When the user 5 moves faster than the average moving speed of the user 5 that has been stored in advance in the table 10a, the distance-for-update that has been set after transmission of the update program (step S12) is not long enough. That is, before the completion of updating the control program, the user 5 gets in the vehicle 1. Therefore, to address the case, until the update instruction part 8e receives the update-completion-notice after the update instruction part 8e gives the instruction to update the control program, the distance detector 8c continues to receive the location data of the user 5. When the distance detector 8c judges that the vehicle-user distance is shorter than the prescribed updating-notification-distance, the server 3 implements processing to respond to the case.

When receiving the location data of the user 5 at the step S33, the distance detector 8*c* recalculates the vehicle-user distance (step S34). The vehicle-user distance is calculated in the same manner as the step S17 shown in FIG. 5.

Next, the distance detector 8*c* judges whether the vehicle-user distance is shorter than the updating-notification-distance (step S35). As described above, a certain distance of 10 meters, for example, is set as the updating-notification-distance. When the vehicle-user distance is shorter than the updating-notification-distance, the distance detector 8*c* judges that the user 5 is more likely to get in the vehicle 1. In this case, the notification part 8*d* judges whether the notice that notifies the user 5 of the control program being updated has been transmitted to the user 5 (step S36). When no notice has been transmitted (No at the step S36), the notification part 8*d* transmits the notice that notifies the user 5 of the control program being updated to the mobile device 6 of the user 5 (step S37). Upon receipt of the notice, the user 5 abandons getting in the vehicle 1, which prevents the user from operating the on-vehicle devices during updating the program.

On the other hand, when it is judged that the notice that notifies the user 5 of the control program being updated has been transmitted to the user 5 (Yes at the step S36), the notification part 8*d* does not transmit the notice to the user 5, and the procedure moves to step S38. The reason why the notification part 8*d* does not transmit the notice to the user 5 in this case is to prevent repeated transmission of the notice with the same contents all the while the vehicle-user distance is shorter than the updating-notification-distance.

In the case of No at the step S35, that is, when the vehicle-user distance is longer than the updating-notification-distance, since there is no need to transmit to the user 5 the notice that notifies the user 5 of the control program being updated, the procedure moves to step S38.

Next, the distance detector 8*c* judges whether the vehicle-user distance is shorter than the update-stop-distance (step S38). As described above, a certain distance of 0.8 meters, for example, is set as the update-stop-distance. When the vehicle-user distance is shorter than the update-stop-distance, it is the case when the user 5 moves in the close range of the vehicle 1 and it is surely foreseen to get in the vehicle 1 or operate the on-vehicle devices.

When the distance detector 8*c* judges that the vehicle-user distance is shorter than the update-stop-distance (Yes at the step S38), the stop instruction part 8*f* transmits to the on-vehicle apparatus 4 an update-stop-signal that instructs stop of updating the control program during updating (step S39). When the stop instruction part 8*f* transmits the update-stop-signal, the processing-for-update terminates. Moreover, when it is judged that the vehicle-user distance is longer than the update-stop-distance (No at the step S38), the procedure moves back to the step S32, and the steps described above are repeated.

Figure 8:
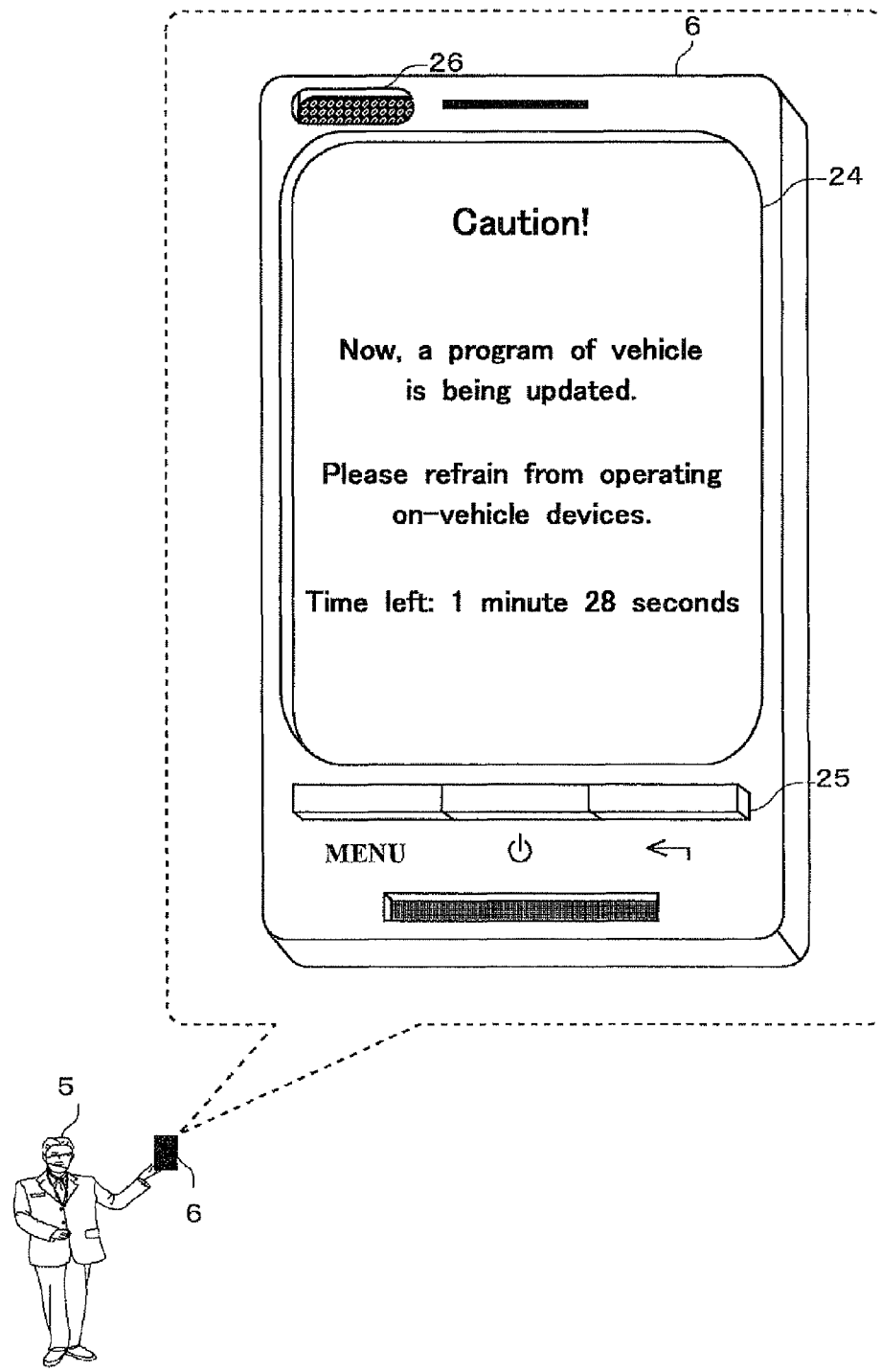
FIG. 8 shows a sample display of notifying of the program being updated.

Next, display on the mobile device 6 carried by the user 5 is described. FIG. 8 shows a sample display of the display 24 of the mobile device 6 in response to the notice transmitted from the server 3 at the step S37.

The display 24 displays the notice in letters, which notifies the user 5 of the control program being updated. The user 5 abandons getting in the vehicle 1 after looking at the display, which prevents the user 5 from operating the on-vehicle devices during updating the program. In addition to the display in letters, a voice notice with the same contents may be generated from the speaker unit 26. In this case, even when the user 5 keeps the mobile device 6 in a bag or a pocket, the user 5 is notified effectively.

FIG. 8 shows the sample display of information of the notice that notifies the user 5 of the control program being updated (step S37). The display 24 may also display, upon change of the contents for display, information of the notice for asking whether the user 5 permits updating the control program (step S21 in FIG. 6), the notice of update completion (step S25), or the notice of non-update (step S26). On another configuration, the user 5 may give prescribed input operations on the input part 25 as a reply to a notice. In this case, displaying required operations on the display 24 prevents operation mistakes by the user 5.

Figure 9:
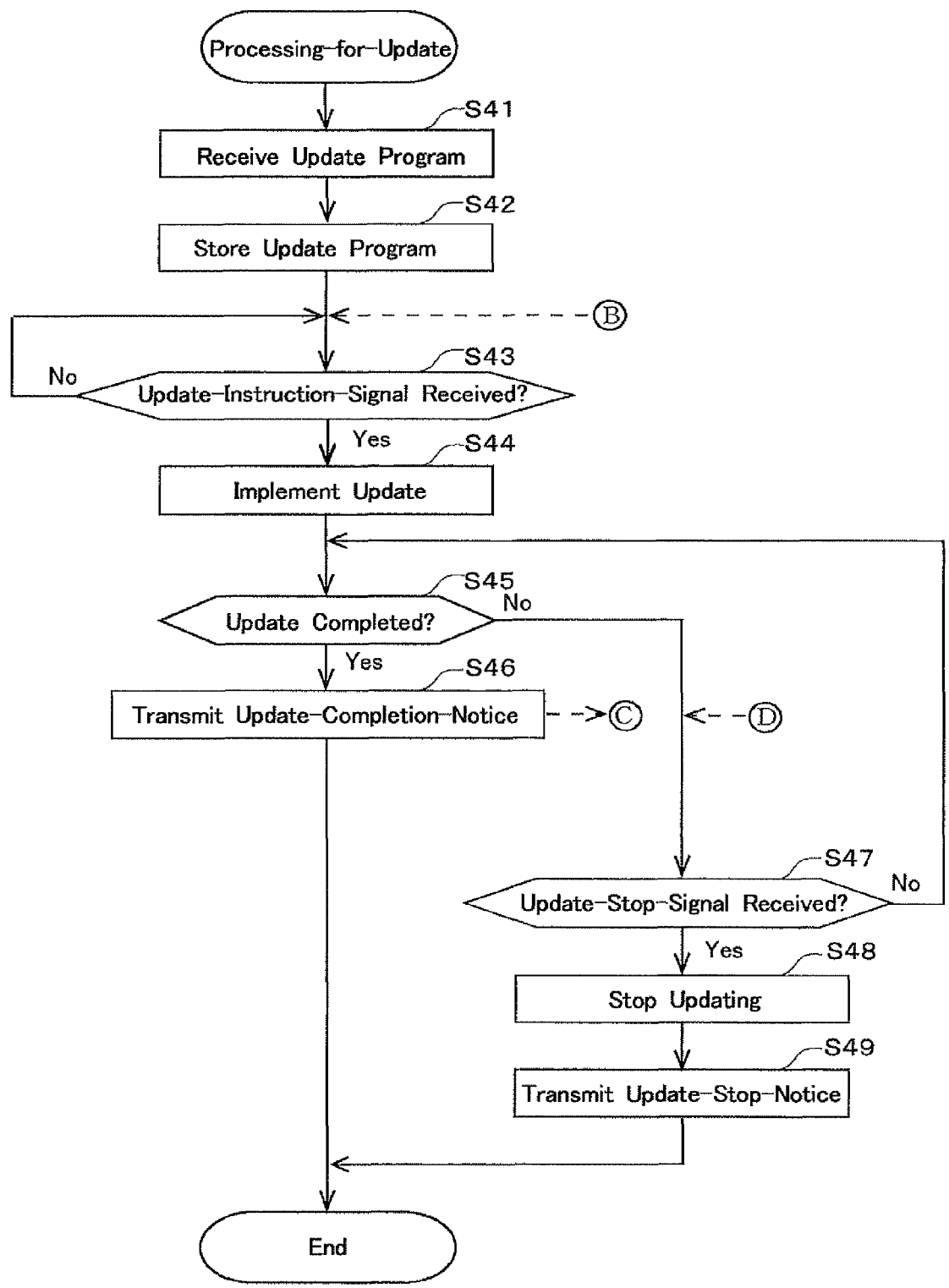
FIG. 9 shows a flow of program updating on a vehicle apparatus.

Next, described is the processing on the on-vehicle apparatus 4 in response to the processing on the server 3 described based on FIG. 5, FIG. 6 and FIG. 7. FIG. 9 shows a processing flow on the on-vehicle apparatus 4.

First, the controller 11 of the on-vehicle apparatus 4 receives the update program sent from the server 3 through the communicator 12 (step S41). As described above, since the controller 11 includes the sleep mode, the controller 11 is intermittently activated at prescribed intervals after the user 5 cuts off the power. Thus, the controller 11 is capable of receiving the update program even in the power-off state.

Upon receipt of the update program, the controller 11 stores the update program in the temporary memory 14 (step S42).

Next, the controller 11 judges whether the communicator 12 has received the update-instruction-signal transmitted from the server 3 at the step S31 shown in FIG. 7 (step S43). The update-instruction-signal gives an instruction to update the control program. When judging that the update-instruction-signal has not been received (No at the step S43), the controller 11 repeats the judging step of the step S43, and remains in a standby state for receiving the update-instruction-signal.

When the controller 11 judges that the update-instruction-signal transmitted from the server 3 has been received (Yes at the step S43), the update part 11*a* updates the control program (step S44).

Next, described is the control for updating the control program 15*b* of the engine ECU 15 by use of the update program 14*a*. First, the update part 11*a* makes a copy of the control program 15*b* stored in the memory 15*a* of the engine ECU 15. The copy of the control program 15*b* is the backup program 15*c*. Making the control program 15*c* causes the engine ECU 15 to control an engine by use of the backup program 15*c* even when updating the control program 15*b* stops in a half-finished state. Moreover, since the control program 15*b* is stored in a half-finished state even when updating the control program 15*b* stops in a half-finished state, updating the control program 15*b* can be restarted from the state right after the stop of updating the program in later. After making the backup program 15*c* in the memory 15*a*, the update part 11*a* reads out the update program 14*a* temporarily stored in the temporary memory 14, and updates the control program 15*b*. The update program 14*a* may update the whole of the control program 15*b* or update a part of the control program 15*b*.

After the control program is updated, the controller 11 judges whether updating the control program has been completed (step S45). Judging whether the updating the control program has been completed is made based on, for example, whether the passage of the time required for updating or longer has been detected. The time required for updating is calculated based on the size of the update program. When judging that updating the control program has been completed (Yes at the step S45), the controller 11 transmits the update-completion-notice indicating that updating the control program has been completed, through the communicator 12 to the mobile device 6 and the server 3 (step S46). Upon transmission of the update-completion-notice, the processing on the on-vehicle apparatus 4 terminates.

On the other hand, when judging that updating the control program has not been completed (No at the step S45), the controller 11 judges whether the update-stop-signal transmitted from the server 3 at the step S39 shown in FIG. 7 has been received (step S47). The update-stop-signal gives an instruction to stop updating the control program. When judging that the update-stop-signal from the server 3 has not been received (No at the step S47), the procedure moves back to the step S45, and the controller 11 makes another judgment whether updating the control program has been completed.

When the controller 11 judges that the update-stop-signal from the server 3 has been received (Yes at the step S47), the stop part 11b stops updating the control program 15b (step S48). Then, the controller 11 stores the information on the stop. The information on the stop includes the name of the ECU that has updated the program, the identification number of the control program 15b, the identification number of the update program and the updated contents of the control program, and is stored in the temporary memory 14. The stored information is used next time when the control program is updated. After storing the information on the stop, the controller 11 controls the communicator 12 to transmit to the mobile device 6 and the server 3 an update-stop-notice indicating that updating the control program has been stopped in a half-finished state (step S49). In this case, the controller 11 transmits to the server 3 additionally various kinds of information on the stop stored in the temporary memory 14 described above. When the controller 11 transmits the update-stop-notice relevant to the control program, the processing on the on-vehicle apparatus 4 terminates.

As above, on the program delivery system 100 of the embodiment, the distance detector 8c of the server 3 derives the distance between the vehicle 1 and the user 5 of the vehicle 1. When the derived distance is longer than the distance-for-update, the update instruction part 8e instructs the on-vehicle apparatus 4 to update a program by use of the update program. This prevents the user 5 from getting in the vehicle 1 and operating the on-vehicle devices during updating the control program, since the update instruction part 8e gives the instruction of updating the control program when the user 5 is far enough away from the vehicle 1. As a result, updating the control program is completed effectively.

Hereinafter, the second embodiment is described. The server 3 of the first embodiment judges whether the vehicle-user distance is longer than the update-stop-distance after the start of updating the control program. When the vehicle-user distance is shorter than the update-stop-distance, the server 3 instructs the on-vehicle apparatus 4 to stop updating the control program. On the other hand, updating the program may be stopped in response to the detection of the user 5 moving closer to the vehicle 1 by the on-vehicle apparatus 4 installed on the vehicle 1. On the second embodiment, updating a program is stopped in response to the detection of a user 5 moving closer to a vehicle 1 by use of short-range communication between an on-vehicle apparatus 4 and a mobile device 6. Since a program delivery system 100 of the second embodiment has a configuration and implements processing very similar to the configuration and the processing of the first embodiment, the points different from the first embodiment are mainly described.

Figure 10:
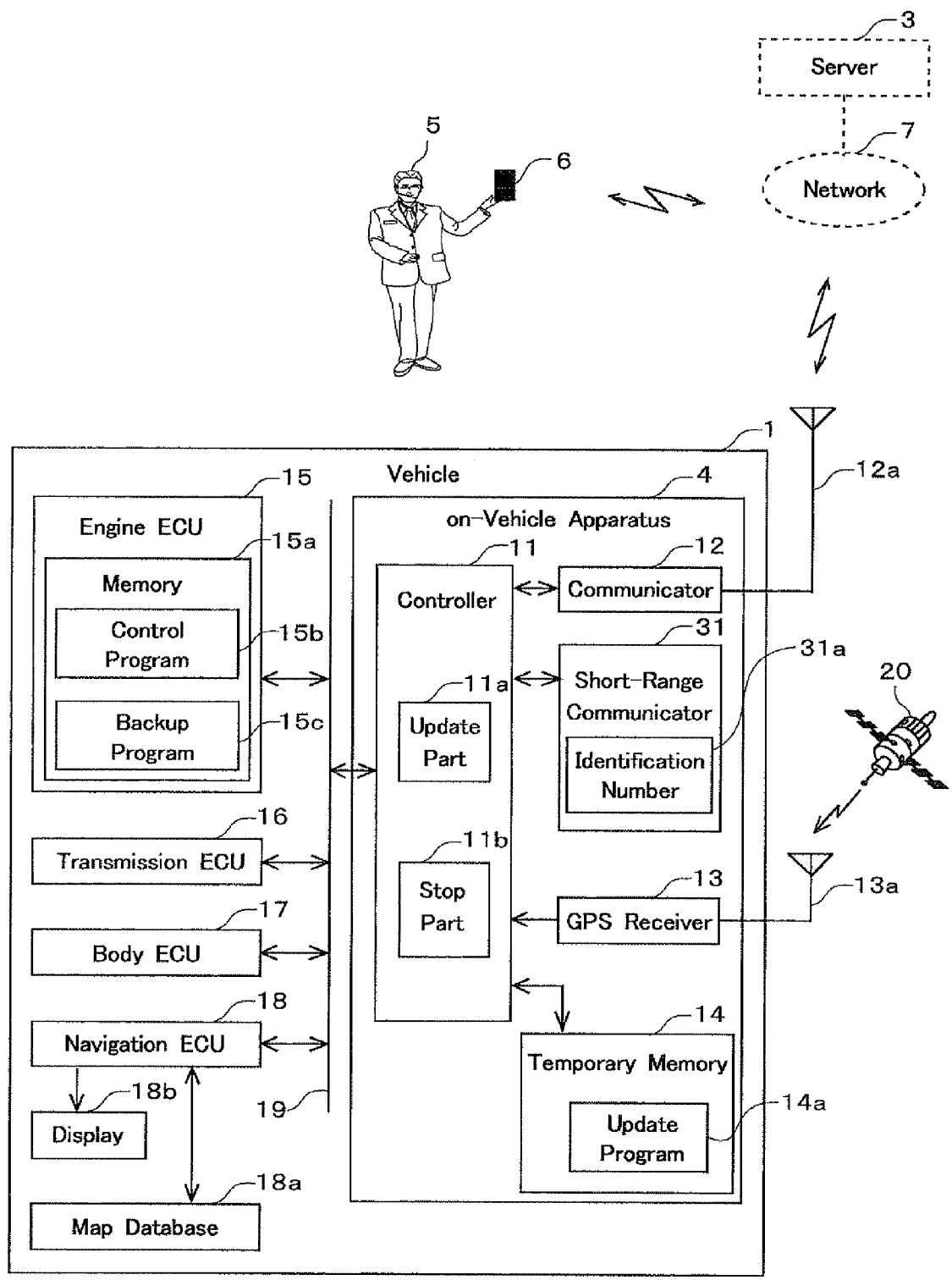
FIG. 10 shows a configuration of an on-vehicle apparatus of the second embodiment.

FIG. 10 shows a configuration of the on-vehicle apparatus 4 of the second embodiment. The on-vehicle apparatus 4 of the second embodiment has the configuration very similar to the configuration of the on-vehicle apparatus 4 of the first embodiment shown in FIG. 3, but partially different. Concretely, the on-vehicle apparatus 4 includes a short-range communicator 31. Here, each of the parts of the configuration shown in FIG. 10, which have the same code as in FIG. 3, works the same way as the part shown in FIG. 3. Thus, only the configuration shown in FIG. 10 different from the configuration shown in FIG. 3 is described.

The short-range communicator 31 is capable of direct communication with the mobile device 6 by wireless communication. The communication is realized by, for example, the method similar to a so-called smart entry system that provides the function for automatically unlocking a vehicle. That is, the short-range communicator 31 transmits signals in prescribed intervals to scan an area for the mobile device 6 moving closer. When the mobile device 6 enters the area where the transmitted signal can arrive (hereinafter, referred to as "short-range-communication area"), a communicator 22 of the mobile device 6 receives the signal. Then, when judging that the received signal has been transmitted from the short-range communicator 31, a controller 21 of the mobile device 6 transmits a signal for reply from the communicator 22 to the short-range communicator 31. The signal for reply includes an identification number of the mobile device 6. A controller 11 of the on-vehicle apparatus 4 verifies the signal for reply transmitted from the mobile device 6. As a result of the verification, when the identification number included in the signal for reply transmitted from the mobile device 6 is identical with an identification number 31a that has been stored in advance, the on-vehicle apparatus 4 judges that the user 5 is moving closer. The short-range-communication area is formed into a circular with radius approximately 0.7 meters or larger but up to around 1.0 meter. Moreover, the interval at which the short-range communicator 31 transmits the signals is approximately 0.3 seconds. The short-range communicator 31 keeps transmitting the signals at the prescribed intervals even while the vehicle 1 is in a parked state.

Figure 11:
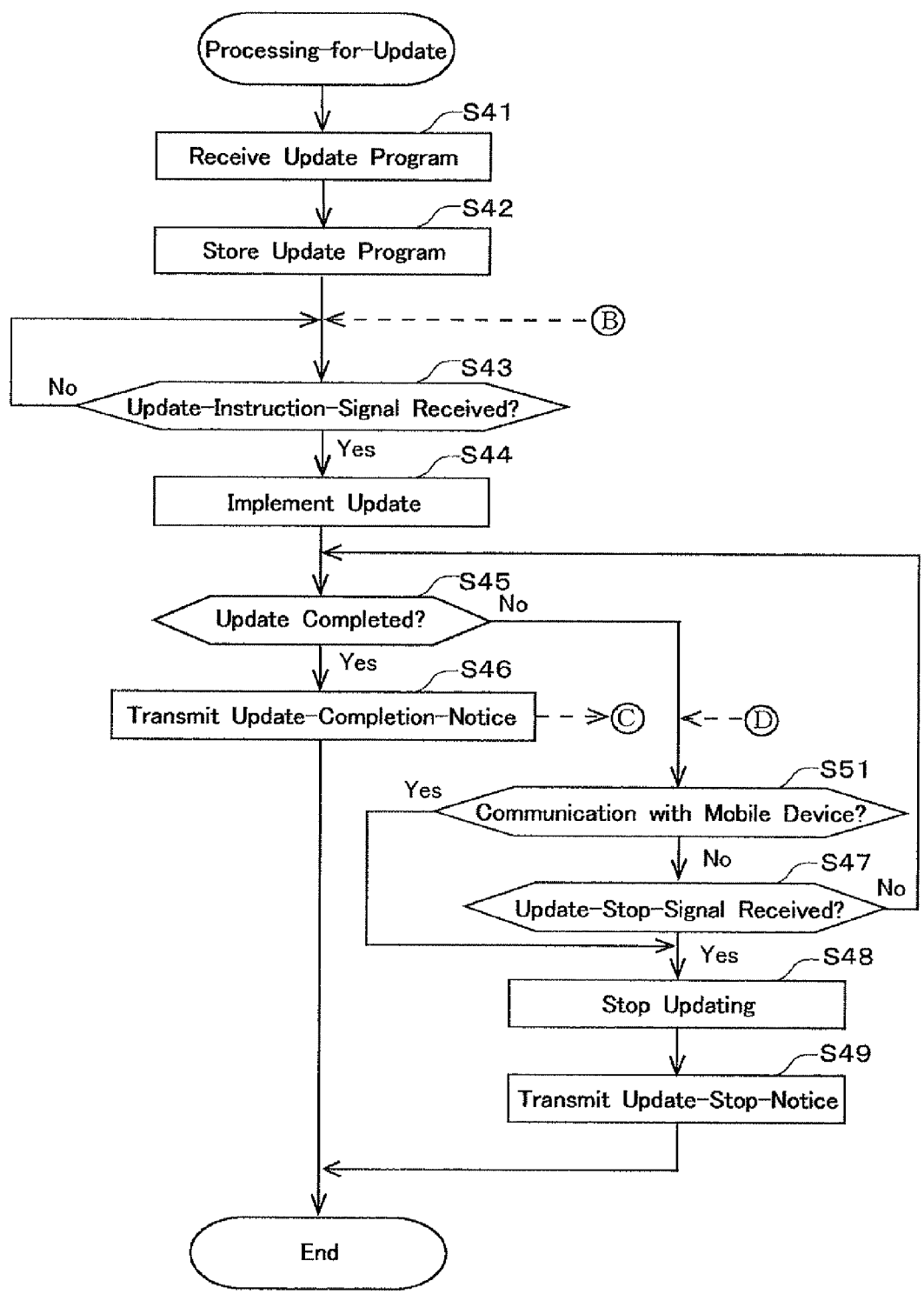
FIG. 11 shows the processing flow on the on-vehicle apparatus of the second embodiment.

Next, the processing-for-update of the on-vehicle apparatus 4 of the second embodiment is described in reference to FIG. 11. FIG. 11 shows the processing-for-update on the on-vehicle apparatus 4 including the short-range communicator 31, which is very similar to the processing-for-update of the first embodiment shown in FIG. 9, but is partially different. Concretely, the processing-for-update shown in FIG. 11 includes step S51. Each of the steps shown in FIG. 11, having the same code as in FIG. 9, fulfills the same function as the function in FIG. 9. Thus, the steps shown in FIG. 11, different from the steps shown in FIG. 9, are only described.

When the controller 11 of the on-vehicle apparatus 4 judges that updating the control program has not been completed (No at step S45), the procedure moves to the step S51.

At the step S51, the controller 11 judges whether communication between the short-range communicator 31 and the mobile device 6 carried by the user 5 has been made. The judgment is made based on the verification regarding the identification number included in the signal transmitted for reply from the mobile device 6. When the controller 11 judges that the communication has been made (Yes at the step S51), the procedure moves to step S48, and a stop part 11b stops updating the control program. On the other hand, when judging that the communication with the mobile device 6 has not been made (No at the step S51), the controller 11 judges whether an instruction signal to stop updating the control program transmitted from the server 3 has been received (step S47).

As above, the on-vehicle apparatus 4 of the second embodiment substantially judges the distance between vehicle 1 and the user 5 based on whether the communication between the short-range communicator 31 and the mobile device 6 of the user 5 has been made. When the communication with the mobile device 6 has been made, that is, the distance between the vehicle 1 and the user 5 is short enough to make communication, the stop part 11b stops updating the control program. Therefore, with no instruction signal from the server 3 to stop updating the control program being received at the time of the user 5 moving closer, the on-vehicle apparatus 4 can alone detect the user 5 moving closer and stop updating the control program.

So far, the embodiments of the invention have been described. However, the invention is not to be considered limited to the embodiments described above, but includes various modifications. Hereinafter, these modifications are described. All of the embodiments described above and the embodiments to be described below can be arbitrarily combined.

In the first embodiment, the on-vehicle apparatus 4 and the vehicle controller such as the engine ECU are individually set, but the both apparatuses may be set in one body. A controller such as an engine ECU may be set as a part of an on-vehicle apparatus that updates a control program by use of an update program. An on-vehicle apparatus that updates a control program by use of an update program may be set as a part of a controller such as an engine ECU.

The program update has been described in the case of the control program 15b of the engine ECU 15. However, the program update may be implemented by use of a control program of a transmission ECU 16 or another vehicle ECU. That is, as long as a controller is installed in a vehicle and controlled by the control program, any controller can be targeted for the program update.

As a mobile device 6, a mobile phone or a smartphone may be used. Moreover, the mobile device 6 may be set in one body with a mobile transmitter that transmits radio waves to unlock vehicle doors, and that is used as a so-called keyless entry system or a so-called smart entry system.

As a short-range communicator 31, DSRC (Dedicated Short Range Communications) or Bluetooth (registered as a trademark) may be used, in addition to the smart entry system described in the second embodiment. As an example usage of DSRC, the short-range communicator 31 working as a transmitter may be installed at a higher location on a vehicle to detect a mobile device 6 moving closer that is carried by a user 5. As an example usage of Bluetooth, a short-range communicator 31 and a mobile device 6 may be linked by wirelessly (by a so-called pairing) to detect a user 5 moving closer.

On the server 3 of the second embodiment, the distance detector 8c derives the vehicle-user distance based on the signal that indicates the location data of the vehicle 1 and is transmitted from the on-vehicle apparatus 4 and the signal that indicates the location data of the mobile device 6 and is transmitted from the mobile device 6 carried by the user 5. However in another configuration, when the on-vehicle apparatus 4 detects the user 5 moving in the close range of the vehicle 1, the on-vehicle apparatus 4 may send a notice that notifying the server 3 of the fact so that the server 3 sends the update-stop-signal.

In the embodiments described above, various functions are implemented by software, specifically by CPU processing based on programs. However, some of these functions may be implemented by electrical hardware circuits.

While the invention has been shown and described in detail, the foregoing description is in all aspects illustrative and not restrictive. It is therefore understood that numerous other modifications and variations can be devised without departing from the scope of the invention.

What is claimed is:

1. A server, comprising:
   a transmitter that sends an update program to an on-vehicle apparatus that updates a control program of a controller installed in a vehicle; and
   a server controller that (i) detects a distance between the vehicle and a user of the vehicle, and (ii) that instructs the on-vehicle apparatus to update the control program by use of the update program in response to the detected distance being equal to or longer than a first distance.

2. The server of claim 1, wherein the server controller:
   notifies a mobile apparatus carried by the user to send a permission to update the control program when the detected distance is equal to or longer than the first distance; and
   receives from the mobile apparatus a permission signal that indicates the permission to update the control program, wherein
   the server controller instructs the on-vehicle apparatus to update the control program when the permission signal has been received.

3. The server of claim 1, wherein
   the first distance is derived based on an update duration for updating the control program.

4. The server of claim 1, wherein
   the first distance is derived based on a size of the update program.

5. The server of claim 1, wherein the server controller:
   notifies the user that the control program is being updated, when the detected distance is equal to or shorter than a second distance during updating of the control program.

6. The server of claim 1, wherein the server controller:
   gives an instruction to stop updating the control program when the detected distance is equal to or shorter than a third distance during updating of the control program.

7. The server of claim 1, wherein
   the server controller detects the distance based on a first signal that indicates a location of the vehicle, the first signal being transmitted from the on-vehicle apparatus, and a second signal that indicates a location of a mobile apparatus, the second signal being transmitted from the mobile apparatus carried by the user.

8. A program delivery system that delivers a control program, the program delivery system comprising:
   an on-vehicle apparatus that updates the control program of a controller installed in a vehicle; and
   a server that instructs the on-vehicle apparatus to update the control program,
   the server including:
      a transmitter that sends an update program to the on-vehicle apparatus; and
      a server controller that (i) detects a distance between the vehicle and a user of the vehicle, and (ii) transmits to the on-vehicle apparatus an instruction signal that gives an instruction to update the control program by use of the update program in response to the detected distance being equal to or longer than a first distance,
   the on-vehicle apparatus including:
      a memory that stores the update program sent from the transmitter;
      a receiver that receives the instruction signal transmitted from the server controller; and
      an update part that updates the control program by use of the update program stored in the memory when the receiver receives the instruction signal.

9. A program delivery method for delivering a control program, the program delivery method comprising the steps of:
- (a) sending an update program to an on-vehicle apparatus that updates the control program of a controller installed in a vehicle;
- (b) detecting a distance between the vehicle and a user of the vehicle; and
- (c) instructing the on-vehicle apparatus to update the control program by use of the update program in response to the distance detected in the step (b) being equal to or longer than a first distance.

10. The program delivery method of claim 9, further comprising the steps of:
- (d) notifying a mobile apparatus carried by the user to send a permission to update the control program when the distance detected in the step (b) is equal to or longer than the first distance; and
- (e) receiving from the mobile apparatus a permission signal that indicates the permission to update the control program, wherein the step (c) instructs the on-vehicle apparatus to update the control program when the permission signal is received in the step (e).

11. The program delivery method of claim 9, wherein
the first distance is derived based on an update duration for updating the control program.

12. The program delivery method of claim 9, wherein
the first distance is derived based on a size of the update program.

13. The program delivery method of claim 9, further comprising the step of:
- (f) notifying the user that the control program is being updated, when the distance detected in the step (b) is equal to or shorter than a second distance during updating of the control program.

14. The program delivery method of claim 9, further comprising the step of:
- (g) giving an instruction to stop updating the control program when the distance detected in the step (b) is equal to or shorter than a third distance during updating of the control program.

15. A non-transitory computer-readable recording medium that stores a server program executable by a computer included in a server, the server program causing the computer to execute the steps of:
- (a) sending an update program to an on-vehicle apparatus that updates a control program of a controller installed in a vehicle;
- (b) detecting a distance between the vehicle and a user of the vehicle; and
- (c) instructing the on-vehicle apparatus to update the control program of the controller by use of the update program in response to the distance detected in the step of (b) being equal to or longer than a first distance.

16. The medium of claim 15, wherein the server program causes the computer to execute the further steps of:
- (d) notifying a mobile apparatus carried by the user to send a permission to update the control program when the distance detected in the step of (b) is equal to or longer than the first distance; and
- (e) receiving from the mobile apparatus a permission signal that indicates the permission to update the control program, wherein the step (c) instructs the on-vehicle apparatus to update the control program when the permission signal is received in the step (e).

17. The medium of claim 15, wherein
the first distance is derived based on an update duration for updating the control program.

18. The medium of claim 15, wherein
the first distance is derived based on a size of the update program.

19. The medium of claim 15, wherein the server program causes the computer to execute the further step of:
- (f) notifying the user that the control program is being updated, when the distance detected in the step (b) is equal to or shorter than a second distance during updating of the control program.

20. The medium of claim 15, wherein the server program causes the computer to execute the further step of:
- (g) giving an instruction to stop updating the control program when the distance detected in the step (b) is equal to or shorter than a third distance during updating of the control program.

* * * * *